(No Model.)

J. NEWMAN.
VEHICLE SEAT.

No. 279,266. Patented June 12, 1883.

Witnesses,
Geo. H. Strong
J. H. Krouse

Inventor,
Jos. Newman
By Dewey & Co.
Attorneys.

N. PETERS, Photo-Lithographer, Washington, D. C.

UNITED STATES PATENT OFFICE.

JOSEPH NEWMAN, OF SACRAMENTO, CALIFORNIA.

VEHICLE-SEAT.

SPECIFICATION forming part of Letters Patent No. 279,266, dated June 12, 1883.

Application filed March 19, 1883. (No model.)

*To all whom it may concern:*

Be it known that I, JOSEPH NEWMAN, of Sacramento, county of Sacramento, State of California, have invented an Improved Vehicle-Seat; and I hereby declare the following to be a full, clear, and exact description thereof.

My invention relates to a new and useful improvement in vehicle-seats; and it consists in a cushion socket or recess in connection with the shell, and in the construction whereby this socket is formed, as will hereinafter fully appear.

The seats of vehicles are usually constructed with a bottom portion to sustain the cushion, and a flaring portion, called technically the "shell," to confine the cushion and to form a slight back or rest for the occupant. This shell is built right out from the bottom, and is generally not more than six inches high. The cushion is then laid on the seat.

In certain classes of vehicles—notably in those known as "side bars"—the springs are made rather light for the sake of appearance, and therefore they do not ride as easily as others. In order to compensate for this, cushions have been used which have been somewhat of an improvement, and I have demonstrated that greater improvement still can be made in this direction, if it were possible to use cushions having deeper springs. In the present construction of the seat this is not possible, as the cushion, being thicker, would throw the rider uncomfortably high; but by lowering or dropping the bottom of the seat, forming a socket or recess below the shell, a thick cushion having deep springs may be used and the result attained. This is the object of my invention—namely, to be enabled to use a cushion having deep springs without throwing the rider too high.

Figure 1:
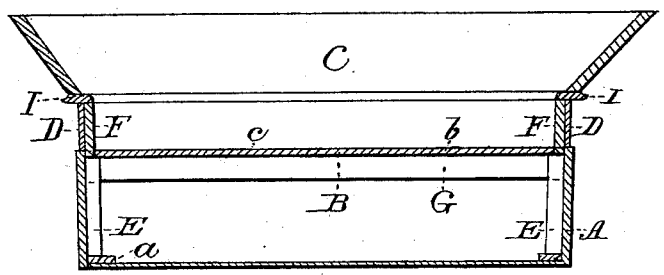
Figure 2:
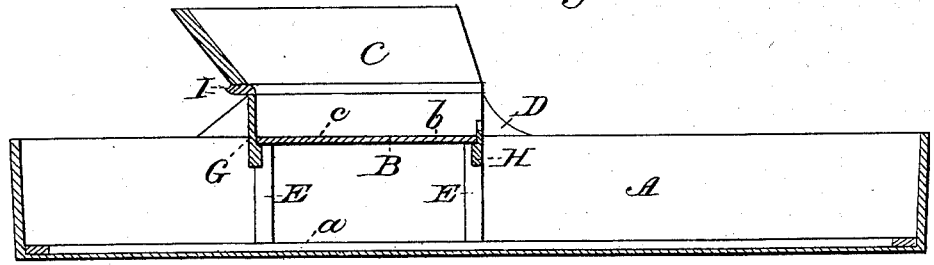
Figure 3:
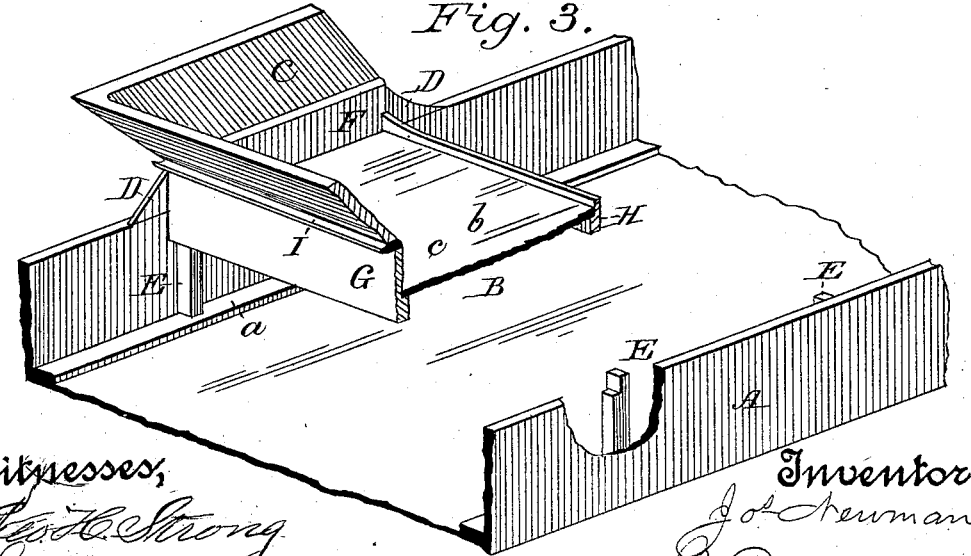

Referring to the accompanying drawings, Figure 1 is a vertical cross-section of body and seat. Fig. 2 is a longitudinal section of same. Fig. 3 is a perspective of a portion of body and seat.

A is the body of a vehicle of that class usually known as "piano-box" for side bars.

B is the seat, formed with a socket or recess, *b*, above which extends the shell C. The ordinary construction of seats is to have the bottom on the same level as the base of the shell; but here it is lowered by reason of the socket *b*. In this socket the cushion is confined, and it is obvious that because of this socket the cushion may have deeper springs than if it were set up higher. In order to fully explain the means by which I arrive at this result, I will describe the construction particularly.

D are the seat-risers, and E are the standards. These rest on the sills *a* of the body, and are placed the same distance from outside to outside as the top of the risers. F are the side pieces halved into the standards and lying alongside of the risers.

G is the back bar cut into the standards and rabbeted to receive the bottom strips, *c*.

H is the front bar let into the standards, and rabbeted correspondingly to the back bar to receive the forward end of bottom strips, *c*. The sides and back bar project upward to form the socket *b;* but the front bar projects but little, though sufficiently to form a guard for the cushion to prevent it from slipping forward.

I is the frame for the shell C, the latter being screwed to the frame, and the frame itself screwed down to the side pieces and back bar; or, if desired, the shell can be set flush with the inside of frame and screwed down. This construction is practical and accomplishes the object in view.

Having thus described my invention, what I claim as new, and desire to secure by Letters Patent, is—

A vehicle-seat constructed in the manner herein described, namely: the standards E, the side pieces, F, halved into the standards, the back bar, G, cut into said standards, and forming, with said side pieces, F, a socket or recess, *b*, said back bar being rabbeted on top, the front bar, H, let into the standards and rabbeted, the bottom strips, *c*, on said back and front bars, the shell-frame I, and shell C, screwed down to the side pieces and back bar, substantially as shown.

In witness whereof I hereunto set my hand.

JOSEPH NEWMAN.

Witnesses:
 A. MEISTER,
 P. L. HICKMAN.